US009877098B1

(12) United States Patent
Riley et al.

(10) Patent No.: US 9,877,098 B1
(45) Date of Patent: Jan. 23, 2018

(54) AUDIO EARPHONES HAVING AN ADJUSTABLE CABLE SYSTEM

(71) Applicant: Microsoft Technology Licensing, LLC, Redmond, WA (US)

(72) Inventors: Raymond Walter Riley, Bainbridge, WA (US); Simon Cameron Dearsley, Bellevue, WA (US); Emron Jackson Henry, Kirkland, WA (US); Kaitlyn Marley Schoeck, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/261,539

(22) Filed: Sep. 9, 2016

(51) Int. Cl.
  *H04R 25/00* (2006.01)
  *H04R 1/10* (2006.01)
  *H04R 5/033* (2006.01)
  *H04R 29/00* (2006.01)
  *H04R 5/04* (2006.01)
  *G06F 3/16* (2006.01)

(52) U.S. Cl.
  CPC .......... *H04R 1/1033* (2013.01); *H04R 5/033* (2013.01); *H04R 5/04* (2013.01); *H04R 29/001* (2013.01); *G06F 3/165* (2013.01); *H04R 2420/07* (2013.01)

(58) Field of Classification Search
  CPC ........ H04R 1/1033; H04R 5/033; H04R 5/04; H04R 2420/07; H04R 29/001; G06F 3/165
  USPC ................................................. 381/182, 384
  See application file for complete search history.

(56) References Cited

U.S. PATENT DOCUMENTS

| | | | |
|---|---|---|---|
| 2007/0098202 A1* | 5/2007 | Viranyi ................ | H04R 1/1041 381/380 |
| 2007/0105403 A1* | 5/2007 | Kuo ..................... | H01R 13/72 439/34 |
| 2007/0248238 A1* | 10/2007 | Abreu .................. | G02C 3/003 381/381 |
| 2008/0112581 A1* | 5/2008 | Kim .................... | H04R 1/1075 381/151 |
| 2008/0144854 A1* | 6/2008 | Abreu .................. | G02C 3/003 381/74 |
| 2009/0238395 A1* | 9/2009 | Jubelirer ............... | H04R 1/08 381/370 |
| 2010/0193221 A1* | 8/2010 | Schoeffmann ....... | H04R 1/1033 174/135 |
| 2011/0051982 A1* | 3/2011 | Abreu .................. | G02C 3/003 381/384 |
| 2011/0158445 A1* | 6/2011 | Pedersen .............. | H04R 1/2853 381/337 |
| 2011/0158455 A1* | 6/2011 | Kim .................... | C08L 3/02 381/370 |

(Continued)

*Primary Examiner* — Tuan D Nguyen
(74) *Attorney, Agent, or Firm* — Arent Fox LLP

(57) ABSTRACT

Features of the present application provide an audio earphone having an adjustable cable system interconnecting a first speaker unit (e.g., left speaker) and a second speaker unit (e.g., right speaker). The adjustable cable system may include a plurality of pods connected to different parts of the adjustable cable system such that the relative movement of the pods may adjust an effective length of the adjustable cable system. The audio earphone of the present disclosure may also include a plurality of operating modes for operating the audio earphone where each of the plurality of operating modes may correspond to one of a plurality of relative distances between a first pod and a second pod.

11 Claims, 8 Drawing Sheets

(56) References Cited

U.S. PATENT DOCUMENTS

| | | | | |
|---|---|---|---|---|
| 2012/0128193 A1* | 5/2012 | Stevinson | ............ | H04R 1/1033 381/384 |
| 2012/0328119 A1* | 12/2012 | Heise | ................... | H04R 1/1066 381/74 |
| 2013/0064412 A1* | 3/2013 | Alstad | .................. | H04R 1/1033 381/380 |

\* cited by examiner

AUDIO EARPHONES HAVING AN ADJUSTABLE CABLE SYSTEM

BACKGROUND

Portable computing devices including personal media players such as MP3 (Moving Pictures Expert Group, MPEG-1, audio layer 3) players, laptop PCs (personal computers), PDAs (personal digital assistants), mobile phones, smart phones, and similar devices commonly use compact and lightweight headsets, which are often called earphones, earbuds, headphones, or headsets, to render voice, audio content, or an audio portion of video to a user. Portable media players typically provide separate left-channel and right-channel signals to the earphone set to produce a stereophonic effect. Each of the left-channel and the right-channel signals may be outputted by separate speaker units of the earphone (e.g., left speaker unit and right speaker unit).

The cable system that generally interconnects each speaker unit with one another (e.g., left speaker unit with right speaker unit) and/or each speaker unit with a media player are generally a fixed length. Manufacturers of the earphones generally choose a default fixed length based on physical characteristics of likely customers from the general population demographics. However, in many instances, the default fixed length may not be suitable for all users or for all uses. For example, the default fixed length may not work well for users having a different size or height than the size or height used by the manufacturer to determine the default fixed length. Further, for example, in a wired system (e.g., where the cable system of the earphone is physically connected to the media player), a user might want to position the media player at different locations (e.g., attached to their waist, attached to their arm, on a table) that can result in too little or too much slack in the cable system. Similarly, for wireless systems (e.g., where the earphone may be connected to the media player over a short range wireless technology (e.g., Bluetooth)), the user may find the default fixed length between each speaker unit is not convenient for different activities or situations (e.g., running versus sitting).

Thus, improvements in audio earphones are desired.

SUMMARY

Features of the present application provide an audio earphone apparatus having an adjustable cable system interconnecting a first speaker unit (e.g., left speaker; also referred to as a first or left side earphone) and a second speaker unit (e.g., right speaker; also referred to as a second or right side earphone). In some examples, the adjustable cable system may include a plurality of pods (e.g., at least a first pod and a second pod) connected to different parts of the adjustable cable system such that the relative movement of the pods may adjust an effective length of the adjustable cable system. The audio earphone apparatus of the present disclosure may also include a plurality of operating modes for operating the audio earphone apparatus, where each of the plurality of operating modes may correspond to one of a plurality of relative distances between a first pod and a second pod.

In some configurations, at least one of the first or the second pods may include at least one power source (e.g., battery) to supply power to the speaker units (or earphones). In one configuration, both the first and the second pods may include a separate power source (e.g., battery). Each of the batteries in the first and the second pods may supplement batteries that may be included in the first speaker unit and/or the second speaker unit. By supplementing the battery capacity of the speaker units/earphones in one or more pods located on the adjustable cable system, features of the present disclosure may provide an advantage of improved battery life of the earphones over traditional systems that typically limit battery capacity to being located in the speaker units/earphones.

In other configurations, batteries may be omitted from the speaker units/earphones all together. In such systems, the speaker units/earphones may rely exclusively on at least one power source located in at least one of the plurality of pods to supply the power for the speaker units/earphones.

Because physical space in the speaker units/earphones is usually limited, removing the batteries from the speaker units/earphones may allow implementations of the present disclosure to include one or more sensors in the speaker units/earphones, where the sensors can provide additional functionality to the earphone apparatus. For instance, in one example that should not be construed as limiting, the one or more sensors can detect when at least one speaker units/earphone is inserted or removed from user's ear. The detected removal from the user's ear of at least one speaker unit/earphone may change an operating mode of the earphone apparatus, e.g., causing the earphone apparatus to automatically pause the playing of multimedia associated with at least one of the audio earphones (e.g., blocking the audio signal to at least one speaker units/earphone or pausing the media player that is connected to audio speaker units/earphones via either physical auxiliary wire or via short range wireless technology, such as Bluetooth). Additionally, the earphone apparatus may automatically resume the multimedia (e.g., unblock the audio signal to a respective speaker unit/earphone or change the media player from the pause mode to the play mode) when the detected at least one removed speaker unit/earphone is subsequently detected to be inserted back into the user's ear.

It should be appreciated by those of ordinary skill that the above-noted configurations examples that should not be considered to be limiting. Further, these examples are not exclusive of one another, but may be combined in some implementations and/or combined with other configurations. For example, the earphone apparatus may be configured to utilize a relatively smaller battery in the speaker units/earphones (as compared to current solutions) to allow one or both speaker units/earphones to also include one or more sensors. In such an implementation, the audio earphone apparatus may benefit from both the extended battery life and, for example, the features of automatically pausing or playing the multimedia when the speaker units/earphones are detected to be removed or inserted into user's ear.

In some examples, a method and a computer readable medium for controlling audio output in an audio earphone is disclosed. The method and the computer readable medium may include determining whether a first speaker unit having a first sensor is inserted or removed from a user's ear, and determining whether a second speaker unit having a second sensor is inserted or removed from the user's ear. In some examples, the method and the computer readable medium may include pausing a multimedia associated with the audio earphone when at least one of the first speaker unit or the second speaker unit is detected to be removed from the user's ear, and resuming the multimedia when the first speaker unit or the second speaker unit is detected to be inserted into the user's ear.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

Figure 1:
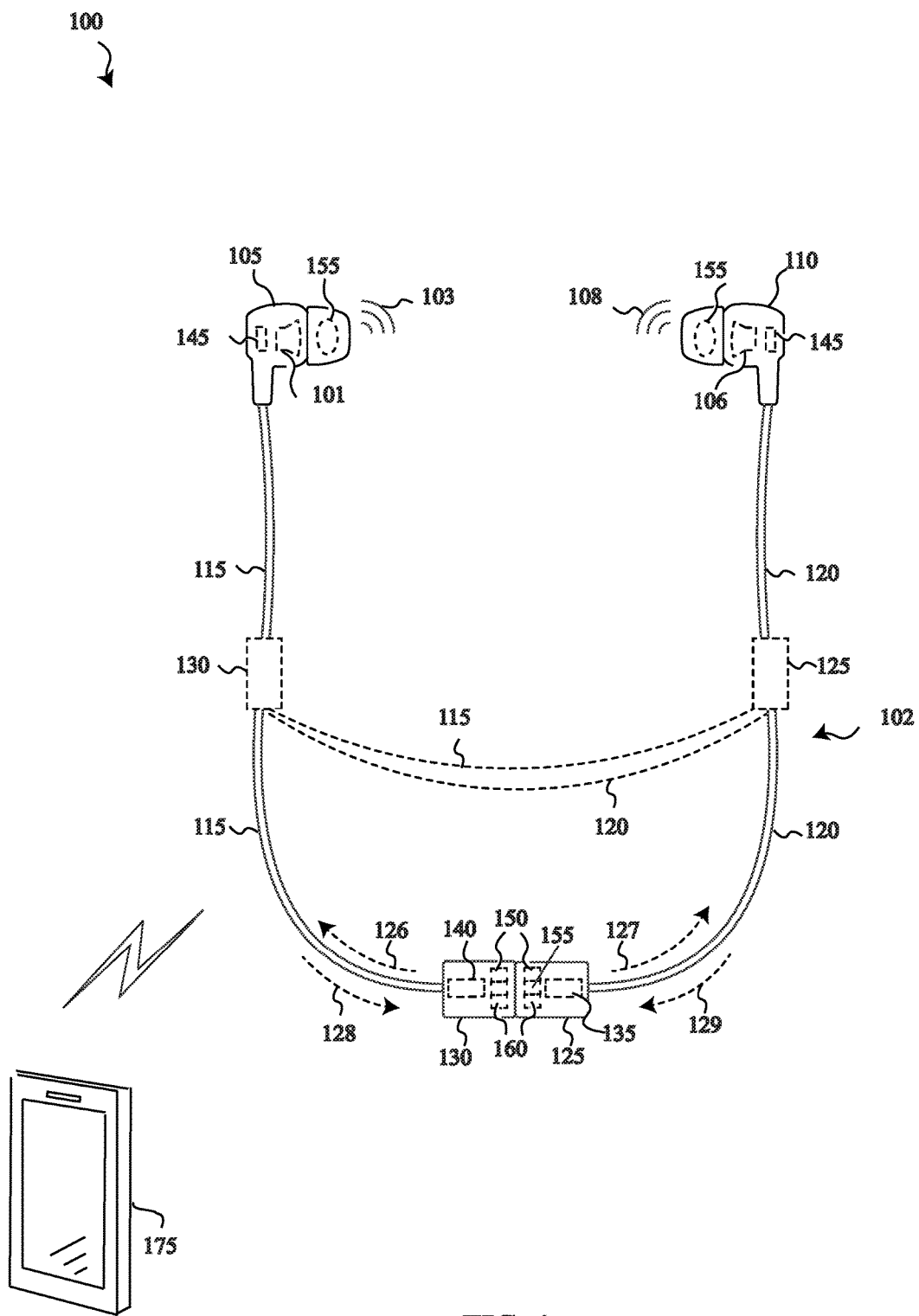
FIG. 1 is a front view of an example of an audio earphone apparatus according to one implementation of the present disclosure.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Described herein are various aspects related to an audio earphone apparatus having an adjustable cable system that includes at least two pods connected to different parts of the adjustable cable system such that the relative movement between the pods may adjust the effective length of the adjustable cable system. For the purposes of this disclosure, the term "cable system" includes one or more wires carrying electricity and/or electrical signals (e.g., representing commands, instructions, and/or audio sounds), e.g., from a battery and/or processor to a speaker unit. Also, the term "effective length of the adjustable cable system" may refer to an overall length of the cable system (some portions of which may be overlapping), e.g., a distance along the cable system between the first speaker unit and the second speaker unit.

As discussed above, conventional audio earphones do not provide users the flexibility to the adjust the effective length of the cable between the two speaker units. Moreover, because manufacturers are limited in the size of the battery that may be incorporated into the audio earphones, the conventional audio earphones have limited battery life. Having a short battery life may be an inconvenience for users that may need to frequently interrupt the use of the conventional audio earphones to charge the battery.

As such, the present disclosure provide techniques for replacing or supplementing the speaker unit batteries with at least one power source mounted within at least one of the plurality of pods (e.g., first pod and/or the second pod) that are connected to different parts of the adjustable cable system of the audio earphone apparatus. Thus, in some aspects, the pods may serve dual roles in both providing the speaker units of the earphone apparatus with a power source (which may provide an extended battery life compared to conventional solutions) and also providing a mechanism for a user to change the effective length of the adjustable cable system. In some examples, adjusting the cable system by way of the pods may be achieved with a first cable having respective fixed connections to the first speaker unit and the first pod, and also having a first movable connection with respect to a second cable and/or a second pod. Contemporaneously, the second cable may have respective fixed connections with the second speaker unit and the second pod, and also a second movable connection with respect to the first cable and/or the first pod (See e.g., 6). Thus, the relative movement of at least two pods fixedly and movably connected to different portions of the cable system may adjust the effective length of the adjustable cable system.

Additionally, in some implementations, the first speaker unit (or first earphone) and the second speaker unit (or second earphone) may additionally include one or more sensors that detect when the respective speaker unit/earphone is placed over or in the user's ear, or alternatively removed from the user's ear. For instance, in some configurations, a smaller battery size than traditionally employed may be included in the first speaker unit and/or the second speaker unit, or the battery may be omitted from one or both speaker units, so as to allow sufficient physical space to insert one or more sensors into at least one of the speaker units/earphones. Additionally, at least one of the speaker units or at least one of the plurality of pods may include a processor coupled to the memory to execute instructions stored in the memory that control the operating modes of the audio earphone apparatus.

Thus, in some configurations, the audio earphone apparatus of the present disclosure may provide an adjustable cable system having an effective length that can be changed by a user to suit an activity or to achieve a level of comfort or convenience desired by a user. Further, in some configurations, the audio earphone apparatus of the present disclosure may alternatively or additionally provide an extended battery life relative to conventional audio earphones by providing at least one pod with a respective power source, thereby giving the audio earphone apparatus a larger power capacity than convention power sources in conventional audio earphones. Moreover, in some configurations, the audio earphone apparatus of the present disclosure may alternatively or additionally provide the structure (e.g., within the speaker units and/or pods, and/or on the cable system) to mount one or more additional components, e.g., sensors, processors, memory that can provide the audio earphone apparatus with additional functionality.

Turning first to FIG. 1, an audio earphone apparatus 100 may include a first speaker unit 105 (or first earphone) and a second speaker unit 110 (or second earphone), each including a respective housing holding respective speakers 101 and 106 for generating, respectively, a first audio output 103 and a second audio output 108. Although the audio earphone apparatus 100 is illustrated with the first speaker unit 105 and the second speaker unit 110 in the form of respective earbuds, it should be understood that features of the present disclosure are adaptable to any type of earphones (e.g., speaker units in earbuds having an attachment mechanism that wraps around a user's ear, speaker units in a headset that cover a user's ear, speaker units in a headset that completely encompass and cover the user's ear). In some examples, the first speaker unit 105 may correspond to the left speaker unit and the second speaker unit 110 may correspond to the right speaker unit that outputs the left-channel and right-channel signals generated by the playing of an audio file or multimedia file by a portable media player 175 which may be integrated with or wirelessly linked to the audio earphone apparatus 100. In some examples, the functionalities of the portable media player 175 may be incorporated within the audio earphone apparatus 100, for example, by including a processor and memory (not shown) included within the audio earphone apparatus 100 to have operating modes that store and play one or more audio files or multimedia files. For instance, the processor (not shown) coupled to the memory within the audio earphone apparatus 100 may execute a one or more playlists of audio or multimedia files, such that the first speaker unit 105 and the second speaker unit 110 output the first audio 103 and the second audio 108, respectively.

According to the present disclosure, the audio earphone apparatus 100 may include an adjustable cable system 102 to connect the first speaker unit 105 and the second speaker unit 110. The adjustable cable system 102 includes a combination of first cable 115 fixedly connected to a first pod 125 and second cable 120 fixedly connected to a second pod 130, where the first pod 125 is also movably connected to the second cable 120 and the second pod 130 is also movably connected to the first cable 115. Further, the first cable 115 and the first pod 125, and the second cable 120 and the second pod 130, can be moved relative to one another to change an effective length of the adjustable cable system 102. For instance, the first cable 115 and the first pod 125 may be moved in directions 127 and 129 along the second cable 120, and/or and the second cable 120 and the second pod 130 may be moved in directions 126 and 128 along the first cable 115, e.g., between at least a relatively longer effective length of the cable system (as illustrated in solid lines) and a relatively shorter effective length of the cable system (as illustrated by dashed lines). Accordingly, the adjustable cable system 102 can have a length that is user-adjustable to suit an activity or desired comfort level of a user.

The first cable 115 and the second cable 120, for example, may include one or more insulated wires for carrying an electrical current and/or electrical signals. For instance, in an implementation, the first cable 115 and the second cable 120 each may include a first insulated wire connected to a positive terminal of a power source and a second insulated wire connected to a negative terminal of a power source, where the first and second insulated wires are also connected to one or more electrical components, such as speakers 101 and 106 and/or a processor, to provide power to operate the electrical components. In some implementations, for example, the first and second insulated wires, and/or one or more additional insulated wires, may also carry electrical signals for controlling one or more electrical components, such as but not limited to electrical signals for generating the first audio output 103 and the second audio output 108.

In some implementations, the first pod 125 and the second pod 130 each may be housing or body that defines a limit for the maximum effective length of the adjustable cable system 102. In some examples where they are used as housings, the first pod 125 and the second pod 130 may additionally define a container for mounting additional components that supplement the functionality of the audio earphone apparatus 100. For instance, the first pod 125 and the second pod 130 may include one or more power sources (e.g., batteries), and/or one or more electrical components (e.g., processor, memory, circuit boards, chips, and/or sensors). Although the example of FIG. 1 illustrates two pods, it should be understood that any number of pods may be included to achieve the features of the present disclosure.

The audio earphone apparatus 100 may additionally include one or more power sources, such as a first power source 135 and a second power source 140, to provide electrical current to power speakers 101 and 106, and, optionally, one or more other electrical components of the audio earphone apparatus 100. For instance, in one implementation as mentioned above, the first power source 135 may be contained within the first pod 125, and the second power source 140 may be contained within the second pod 130. In other implementations, the one or more power sources may alternatively, or additionally, be mounted within the first speaker unit 105 and/or the second speaker unit 110, or within additional pods (not illustrated) fixedly and/or movably attached to the first cable 115 and/or the second cable 120. A suitable example of the one or more power sources may include, but is not limited to, a battery, a capacitor, and/or a supercapacitor.

As noted above, the audio earphone apparatus 100 may also include a processor and a memory to manage the operations of the audio earphone apparatus 100. In some examples, the processor and the memory may be mounted within at least one of the first speaker unit 105 or the second speaker unit 110 (as shown in FIG. 1 as part of control components 145), or within at least one of the plurality of pods (e.g., first pod 125 and the second pod 130). In some examples, the processor and the memory may receive power from the one or more power supply sources (e.g., first power source 135 and second power source 140).

The processor may operate the audio earphone apparatus 100 in accordance with a plurality of operating modes. The plurality of operating modes may include, but are not limited to, any combination of one or more audio player modes (e.g., to play different audio (such as workout music versus studying music) at different lengths), one or more audio pause modes, one or more voice communication modes, one or more power conserve (e.g., sleep) modes, one or more charging modes, a fast forward mode, a reverse mode, a forward skip mode, a reverse skip mode, or any other type of mode relevant to an audio or multimedia device. In other examples, the plurality of operating modes may include a first operating mode and a second operating mode that are selected based on signals from one or more sensors 155 (discussed below) that determine whether at least one of the speaker units/earphones 105 and 110 has been removed or inserted into the user's ear. For instance, the first operating mode may include playing (or resuming) the multimedia/audio associated with the portable media player 175 when at least one of the first speaker unit 105 and the second speaker unit 110 are detected to be inserted into user's ear by the one or more sensors 155. The second operating mode may include pausing the multimedia associated with the portable media player 175 when the one or more sensors 155 detect that at least one of the speaker units/earphones 105 and 110 is removed from the user's ear.

In one implementation, as will be explained in more detail below, each of the plurality of operating modes may correspond to at least one of a plurality of different effective lengths of the adjustable cable system 102, e.g., to respective ones of a plurality of relative distances along the adjustable cable system 102 between the first pod 125 and the second pod 130. It should be noted that the effective length or relative distance may correspond to a single length or distance value, or to a range of length or distance values. For example, when the adjustable cable system 102 is adjusted to a certain effective length, such as the relatively shorter length (as illustrated by dashed lines in FIG. 1), the audio earphone apparatus 100 may execute an audio player mode. Further, for example, when the adjustable cable system 102 is adjusted to a certain effective length, such as the relatively longer length (as illustrated by solid lines in FIG. 1), the audio earphone apparatus 100 may execute a different mode, such as a pause mode or a voice communication mode or a battery charging mode. It should be understood that the above examples are not limiting, and that any of the plurality of operating modes may be associated with any effective length of the adjustable cable system 102 or any relative distance along the adjustable cable system 102 between the first pod 125 and the second pod 130.

In some examples, the plurality of operating modes of the audio earphone apparatus 100 may be associated with either the effective length of the adjustable cable length, or the relative distance between the first pod and the second pod, or combination of both. For instance, in some examples, a first effective length and/or a first relative distance between the two pods may be associated with a first operating mode, a second effective length and/or a second relative distance between the two pods may be associated with a second operating mode, and a third effective length and/or a third relative distance between the two pods may be associated with a third operating mode (and so on). In some examples, the association of the effective length and/or relative distance with different operating modes may be based on a fixed value or range of lengths or distances, and each mode may be associated with more than one of each or both fixed value or range of lengths or distances (e.g., first operating mode for first effective length range between 30-42 inches or 0-5 inches of relative distance range; second operating mode for second effective length range between 18-29 inches or 6-10 inches of relative distance range).

In another implementation, for example, each of the plurality of operating modes may correspond to a combination of factors, e.g., a different effective length of the adjustable cable system 102, or a relative distance along the adjustable cable system 102 between the first pod 125 and the second pod 130, combined with one or more other factors, such as a signal from one or more other electrical components (e.g., pressure sensor 155, battery charger). In some examples, pressure sensor 155 may be replaced with one or more of accelerometer sensor, gyro sensor, and/or magnetometer. For example, when the adjustable cable system 102 is adjusted to a certain effective length, such as the relatively longer length (as illustrated by solid lines in FIG. 1), and a pressure sensor 155 detects a respective pressure corresponding to one or both of the first speaker unit 105 and the second speaker unit 110 being inserted into or removed from an ear of the user, then the audio earphone apparatus 100 may respectively execute an audio player mode (when inserted) or an audio pause mode and/or a voice communication mode (when not inserted). Further, in another example configuration, when the adjustable cable system 102 is adjusted to a certain effective length, such as the relatively longer length (as illustrated by solid lines in FIG. 1), and a pressure sensor 155 detects a respective pressure corresponding to one or both of the first speaker unit 105 and the second speaker unit 110 being inserted into or removed from an ear of the user, then the audio earphone apparatus 100 may respectively execute an audio player mode (when inserted) or a battery charging mode (when not inserted). Again, it should be understood that the above examples and configurations are not limiting, and that any of the plurality of operating modes may be associated with any combination of factors, including any effective length of the adjustable cable system 102 or any relative distance along the adjustable cable system 102 between the first pod 125 and the second pod 130, and one or more of any other signals from other electrical components of the audio earphone apparatus 100.

Additionally, the audio earphone apparatus 100 may include one or more control components 145, such as a processor and/or a memory and/or data and instructions, that are configured to operate audio earphone apparatus 100 according to the plurality of operating modes. For instance, the plurality of operating modes may be programmed into the processor, or stored in the memory as computer-readable instructions that are executable by the processor. For example, the one or more control components 145 may be configured to control operation of one or any combination of the media player 175 respective speakers 101 and 106, the one or more power sources (e.g., the first power source 135 and the second power source 140), and any other electrical component(s) (e.g., sensors, microphone) associated with the audio earphone apparatus 100. In some examples, the one or more control components 145 may be mounted in one or more of the pods (e.g., first pod 130 and/or second pod 125) and/or in one or more of the speaker units (e.g., first speaker unit 105 and/or second speaker unit 110).

In some implementations, the audio earphone apparatus 100 may also include one or more communication components 150 configured to enable communication exchanges between components of the audio earphone apparatus 100 and/or between the audio earphone apparatus 100 (and/or its components) and one or more external devices (e.g., a media player, a host device), and/or between the earphone apparatus 100 and/or the media player 175 and the user. In an example, the one or more communication components 150 may include one or more wireless communication interfaces (e.g., WiFi, Bluetooth, cellular) configured to allow communications or data to be exchanged between the audio earphone apparatus 100 and one or more other devices accessible via a respective wireless interface. For instance, the one or more communication components 150 may provide a Bluetooth interface to wirelessly link to the media player 175 so that music may be streamed to the speaker units (e.g., the first speaker unit 105 and/or the second speaker unit 110) of the audio earphone apparatus 100. In an example of wired communication, the one or more communication components 150 may alternatively or additionally include one or more buses configured to allow communications or data to be exchanged between the one or more control components 145, the media player 175 and/or the speaker units (e.g., the first speaker unit 105 and/or the second speaker unit 110) of the audio earphone apparatus 100. In another example, the one or more communication components 150 may alternatively or additionally include one or more user interfaces to allow user interaction with the audio earphone apparatus 100 and/or media player 175. For example, the one or more communication components 150 may include one or more microphones for providing audio input to the portable media player 175 or to a wirelessly linked phone during telephone call. In some examples, the one or more microphones 150 may be included within one or more of the pods (e.g., the first pod 130 and/or the second pod 125) and/or in one or more of the speaker units (e.g., the first speaker unit 105 and/or the second speaker unit 110). In another example, the one or more communication components 150 may include one or more displays for presenting information to a user and/or for receiving a user input.

The audio earphone apparatus 100 may also communicate with one or more host devices (see e.g., FIG. 7), which may include but are not limited to external speakers and/or charging stations. In some examples the host device (FIG. 7) may provide electric current to the plurality of pods in order to charge at least one power source of the audio earphone apparatus 100. Additionally, the control component 145 (e.g., processor and memory) may be configured to seamlessly transfer audio signals received from the portable media player 175 to the host device such that the host device (e.g., external speaker) may function has the audio output for the portable media player 175. In some examples, the transfer may be managed by the processor of the audio earphone apparatus 100 based on one or more operating modes. One operating mode may include detecting when the audio earphone apparatus 100 is within the proximity of the host device (e.g., is less than a predetermined threshold), and automatically transitioning the operations from the audio earphone apparatus 100 to the host device. In other examples, when the processor, based on one or more sensors, detects that the distance between the audio earphone apparatus 100 and the host device exceeds the predetermined threshold, the audio earphone apparatus 100 may reacquire the control of the audio functionalities associated with the portable media player 175.

Thus, in one example, when a user, while listening to a music playlist on the audio earphone apparatus 100 enters his or her home, the control components 145 may detect the availability of the host device within a certain proximity and automatically trigger transfer of the audio output to the host device. As such, the user may place the audio earphone apparatus 100 on or near the host device to allow the at least one power source (e.g., first power source 135 and/or second power source 140) to recharge. However, when the user again leaves the house, while the audio is playing on the host device, the control components 145 may detect that the location of the host device has exceeded a predetermined distance or communication threshold relative to the location or communication range of the audio earphone apparatus 100, and thus reacquire control on the audio earphone apparatus 100 of the audio functionalities associated with the portable media player 175.

Additionally, in some examples, the audio earphone apparatus 100 may include corresponding connectors 160 configured to releasably connect adjacent pods, e.g., at least the first pod 125 and the second pod 130. For instance, in some implementations, adjacent pods may be desired to be connected to hold them in a relative position, and/or to establish a communication or electrical interface for exchanging data, signals, or electricity (e.g., to combine the capacity of two batteries, and/or for charging purposes). For example, the connectors 160 may include non-electrically conducting mechanisms, e.g., opposing magnets or corresponding male and female mechanical elements, or an electrically conductive interface, e.g., opposing conductive contact surfaces or engaging elements.

As noted above, the audio earphone apparatus 100 may additionally include one or more sensors 155 for detecting a certain configuration of the audio earphone apparatus 100. For instance, the one or more sensors 155 may be configured to detect a different effective length of the adjustable cable system 102, or a relative distance along the adjustable cable system 102 between the first pod 125 and the second pod 130. In this example, for instance, the one or more sensors 155 may include a proximity sensor (e.g., to detect the proximity of the first pod 125 relative to the second pod 130), such as an inductance sensor, a capacitance sensor, an infrared sensor, light sensor, etc. In this case, the one or more sensors 155 may be used to generate a signal that can be an input to the one or more control components 145 to cause triggering of respective ones of the plurality of operating modes of the audio earphone apparatus 100.

Further, for example, in an alternative or additional implementation, the one or more sensors 155 may be configured to detect when the first speaker unit 105 and/or the second speaker unit 110 are inserted or removed from the user's ear (or placed over the ear in instance of an over-the-ear headphones). In this example, for instance, the one or more sensors 155 may include a pressure sensor, a transducer, or a proximity sensor (e.g., to detect the proximity of the first pod 125 relative to the second pod 130), such as an inductance sensor, a capacitance sensor, an infrared sensor, light sensor, etc.

In some implementations of this example, the one or more sensors 155 may be included in one or more of the speaker units (e.g., the first speaker unit 105 and/or the second speaker unit 110) and/or in one or more of the pods (e.g., the first pod 130 and/or the second pod 125). For example, in some implementations, because physical space in the smaller earphones (e.g., earbuds) is usually limited, removing the batteries from the speaker units (e.g., first speaker unit 105 and/or second speaker unit 110) or utilizing smaller sized batteries in the speaker units, may allow features of the present disclosure to include one or more sensors to be incorporated into the first speaker unit 105 and the second speaker unit 110 in order to detect when the audio earphone apparatus 100 is inserted or removed into user's ear. In this example, the one or more sensors 155 may be pressure sensors or transducers that detect pressure change when the speaker unit(s) (e.g., the first speaker unit 105 and/or the second speaker unit 110) are inserted or removed from the user's ear. Alternatively, in this example, the one or more sensors 155 may be infrared sensors, proximity sensors, light sensors, touch sensor, accelerometer sensor, gyro sensor, magnetometer, or any other type of sensor that can detect when the speaker unit(s) (e.g., the first speaker unit 105 and/or the second speaker unit 110) are inserted (or near to) or removed from the user's ear. In this case, the one or more sensors 155 may be used to generate a signal that can be an input to the one or more control components 145 to cause triggering of respective ones of the plurality of operating modes of the audio earphone apparatus 100.

Figure 2:
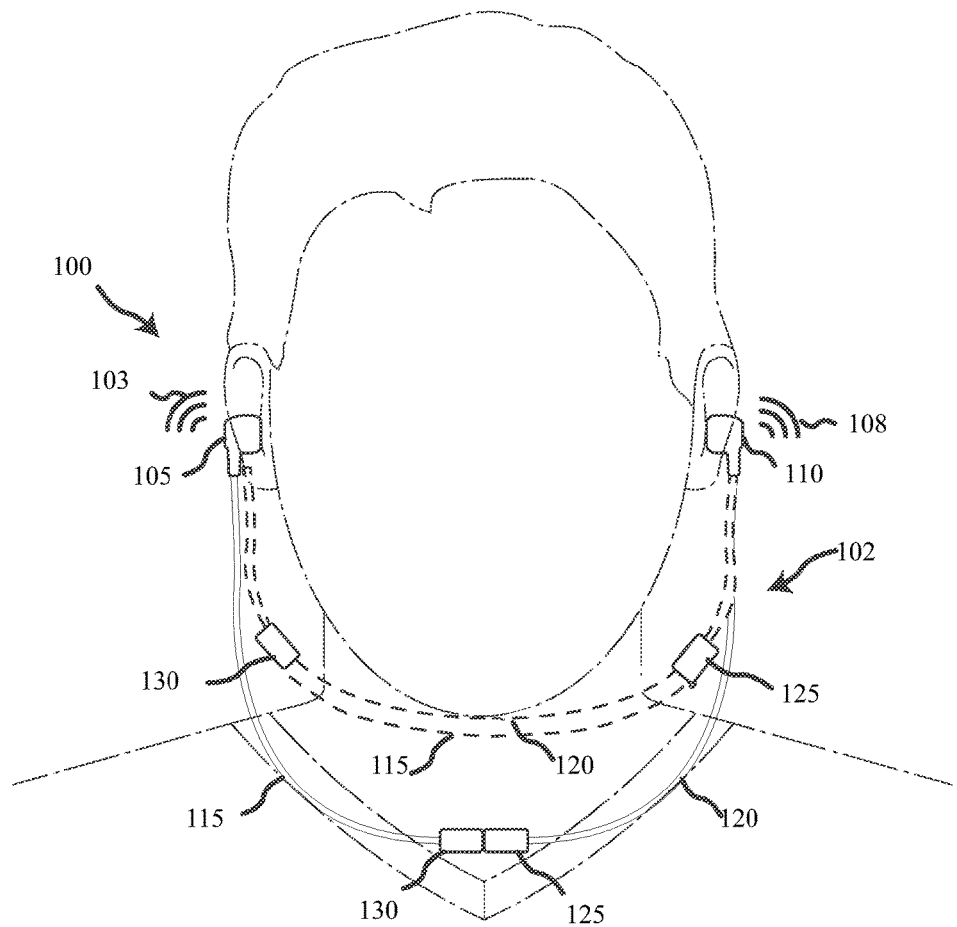
FIG. 2 is a front view of the example audio earphone apparatus of FIG. 1 being used by a user, where speaker units of the audio earphone apparatus automatically play multimedia when the first speaker unit and/or the second speaker unit are detected to be inserted into the user's ear based on one or more sensors in accordance with one implementation of the present disclosure.

Referring to FIG. 2, in one example configuration of the audio earphone apparatus 100, the one or more sensors 155 may allow the audio earphone apparatus 100 to control the media player 175 to automatically play the audio file or multimedia file (e.g., generate the first audio output 103 and the second audio output 108) when the one or more sensors 155 (see FIG. 1) detect that the first speaker unit 105 and the second speaker 110 unit are inserted into the user's ear. In some examples, the one or more sensors 155 may transmit a trigger signal to the control component 145 (e.g., processor) upon detecting a change in configuration or state (e.g., when a user inserts or removes at least one of the speaker units/earphones 105 and 110 from the ear). For example, if both the first speaker unit 105 and the second speaker unit 110 are detected to be inserted in the user's ear, the one or more sensors 155 may transmit a trigger signal to the processor of the audio earphone apparatus 100 (e.g., control component 145) to allow the processor to play or resume the audio or multimedia on the portable media player 175, and output the first audio output 103 and the second audio output 108.

As discussed above, the audio earphone apparatus 100 may also include an adjustable cable system 102 to connect the first speaker unit 105 and the second speaker unit 110. The adjustable cable system 102 includes a combination of first cable 115 fixedly connected to a first pod 125 and second cable 120 fixedly connected to a second pod 130, where the first pod 125 is also movably connected to the second cable 120 and the second pod 130 is also movably connected to the first cable 115. Further, the first cable 115 and the first pod 125, and the second cable 120 and the second pod 130, can be moved relative to one another to change an effective length of the adjustable cable system 102 (e.g., shorter effective length shown in dashed lines or longer effective length shown in solid lines). Accordingly, the adjustable cable system 102 can have a length that is user-adjustable to suit an activity or desired comfort level of a user.

In some examples, the processor of the audio earphone apparatus 100 may further control the operations of the audio earphone apparatus 100 and the portable media player 175 based on the one or more effective lengths of the cable system 102 (and/or relative distance between pods) selected by the user. For example, the media player 175 may store a plurality of music playlists (e.g., a first playlist and a second playlist, each having different combination of music/audio stored therein). As the user adjusts the effective length of cable system 102 by moving the first pod 125 and the second pod 130 along the adjustable cable system 102, at least one of the sensors 155 may detect the configuration and signal the processor, and in response, the processor of the audio earphone apparatus 100 may signal the portable media player 175 to change the music playlist from the first playlist to the second playlist based on a determined relationship (which may be user configured) between a respective effective length of the cable system 102 (and/or relative distance between pods) and a respective playlist. For instance, with a relatively shortened effective length of the cable system 102, which may be associated with an active activity such as running, a playlist having more energetic music may be triggered as compared to a playlist having more somber music, which may be associated with a relatively longer effective length of the cable system 102. Thus, in some aspects, different playlists may play depending on the effective length of the cable system.

Figure 3:
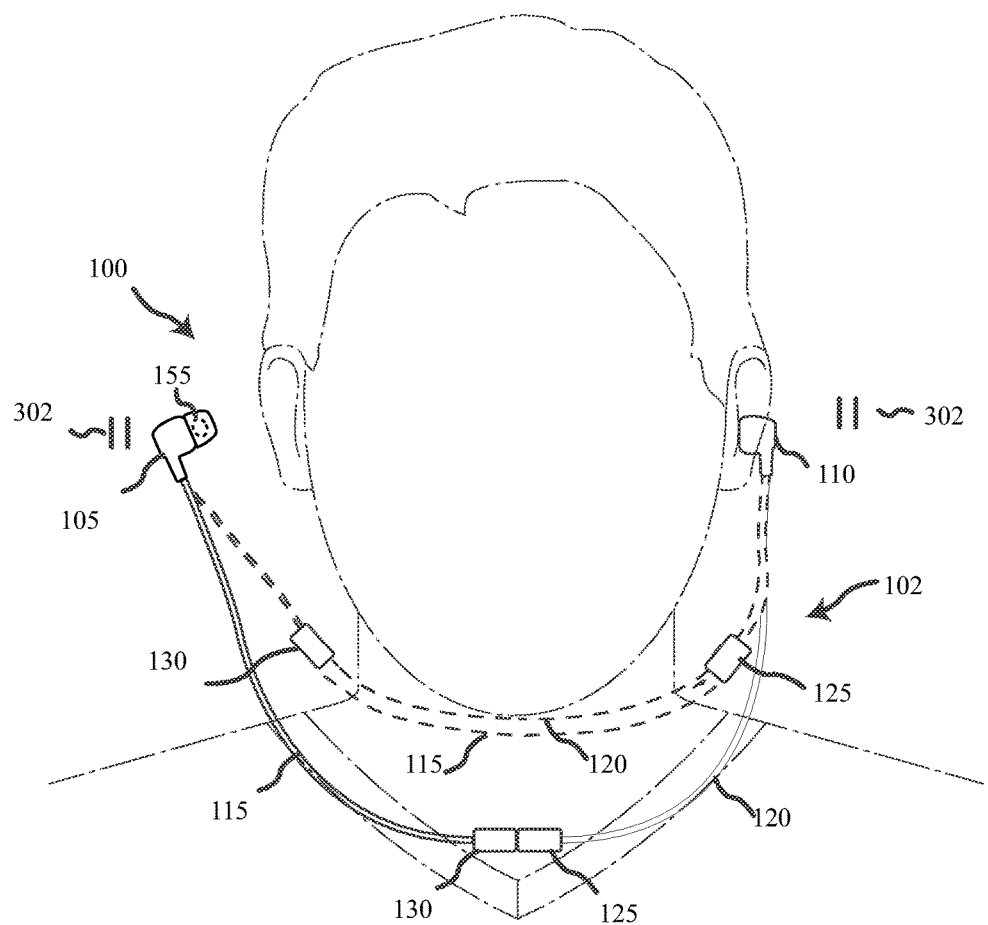
FIG. 3 is a front view similar to FIG. 2, but where the speaker units automatically pause the playing of multimedia when the first speaker unit and/or the second speaker unit are detected to be removed from the user's ear based on one or more sensors in accordance with one implementation of the present disclosure.

Additionally or alternatively, referring to FIG. 3, another example configuration 300 may allow the audio earphone apparatus 100 to automatically pause (as indicated by symbol 302) the playing of the audio or multimedia (e.g., to stop generating the first audio output 103 and the second audio output 108) by the multimedia player 175 associated with the audio earphone apparatus 100 when the one or more sensors 155 detect that at least one of the first speaker unit 105 or the second speaker unit 110 is removed from the user's ear. This feature may be beneficial, for example, to the extent that a user does not have to manually interface with the portable media player 175 to pause or play the audio or multimedia when the user removes or inserts at least one of the speaker units/earphones 105 and 110 from the ear. Inserting the speaker unit (at least one of the first speaker unit 105 or the second speaker unit 110) back into the user's ear may trigger the audio earphone apparatus 100 to cause the media player 175 to resume playing the audio or multimedia file (e.g., the music or video that was previously paused) without requiring additional user interaction.

Figure 4:
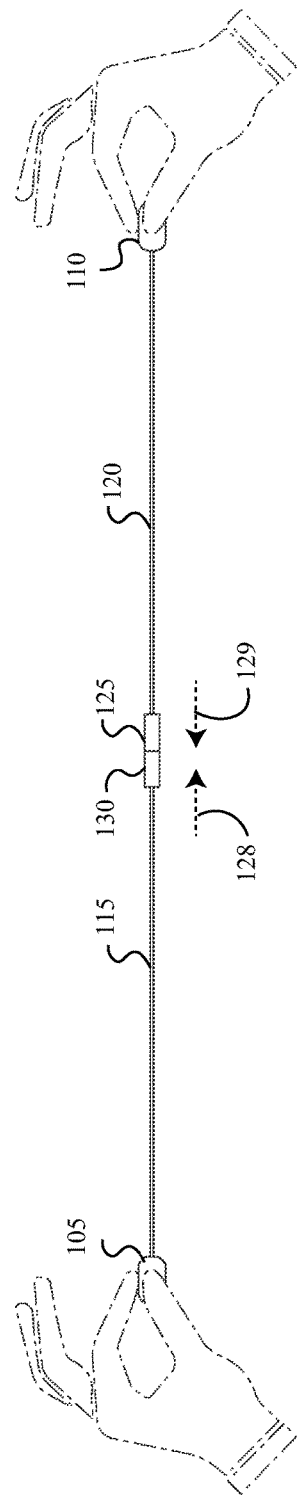
FIG. 4 is a bottom view of the example audio earphone apparatus of FIG. 1 in an extended position corresponding to a longest effective length of an adjustable cable system in accordance with one implementation of the present disclosure.
Figure 5:
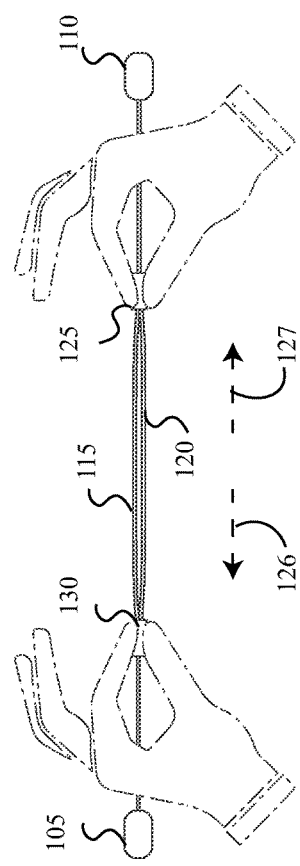
FIG. 5 is a bottom view of the example audio earphone apparatus of FIG. 1 in a shortened position corresponding to a shortened effective length of the adjustable cable system in accordance with one implementation of the present disclosure.

Referring to FIG. 4 and FIG. 5, different configurations 400 and 500 of the audio earphone apparatus 100 correspond to changing of the effective length of the adjustable cable system 102 in accordance with the present disclosure. As noted, the audio earphone apparatus 100 may include an adjustable cable system 102 to connect the first speaker unit 105 and the second speaker unit 110. The audio earphone apparatus 100 may additionally include a first pod 125 having a first power source 135 (not shown) and a second pod 130 having a second power source 140 (not shown). The first pod 125 and the second pod 130 may be separately connected to different parts of the adjustable cable system 102 such that the relative movement of the first pod 125 and the first cable 115 with respect to the second pod 130 and the second cable 120 may adjust the effective length of the adjustable cable system 102. For instance, as illustrated by the transition from configuration 400 (FIG. 4) to configuration 500 (FIG. 5), as the user moves the first pod 125 in direction 127 and the second pod 130 in direction 126 across the adjustable cable system 102, the distance between the first speaker unit 105 and second speaker unit 110 (effective length of the adjustable cable system 102) may be reduced. Conversely, as illustrated by the transition from configuration 500 (FIG. 5) to configuration 400 (FIG. 4), as the first pod 125 is moved in direction 129 and the second pod 130 is moved in direction 128 to bring them close to or in contact with each other, the distance between the first speaker unit 105 and second speaker unit 110 (effective length of the adjustable cable system) may be increased to a maximum effective length.

Additionally or alternatively, as will be explained in more detail with respect to the subsequent figures, the relative distance between the first pod 125 and the second pod 130 may be one of one or more factors that dictate the operating mode of the audio earphone apparatus 100, either alone or in combination with one or more factors (such as one or more signals or inputs from one or more sensors 155).

For example, if the relative distance between the first pod 125 and the second pod 130 (and/or the effective length of the adjustable cable system 102) is at least a first distance as detected by the one or more sensors 155, the control components 145 may operate the audio earphone apparatus 100 in a first operating mode (e.g., audio player mode). If, however, the relative distance between the first pod 125 and the second pod 130 (and/or the effective length of the adjustable cable system 102) is at least second distance, the control components 145 may operate the audio earphone apparatus 100 in a second operating mode (e.g., voice communication mode). In some examples, if the relative distance between the first pod 125 and the second pod 130 (and/or the effective length of the adjustable cable system 102) is less than the first distance (e.g., FIG. 4), the control components 145 may transition the audio earphone apparatus 100 into a power conserve mode. The power conserve mode may include sleep mode that utilizes less power than an active mode, or may include powering off the audio earphone apparatus 100.

In other examples, the audio earphone apparatus 100 may transition to the power conserve mode when the relative distance between the first speaker unit 105 and the second speaker unit 110 (and/or the effective length of the adjustable cable system 102) is less than a threshold distance. For instance, the threshold distance may be a fixed distance set by a manufacturer of audio earphone apparatus 100 or components thereof, and may correspond to an average distance between the ears of a sample set of users. For example, when the two speaker units are in close proximity of one another as detected by the one or more sensors 155, the control components 145 of the audio earphone apparatus 100 may deduce that the two speaker units are likely not in-use (e.g., the distance between the speaker units is less than an average distance between the sample set of user's ears). In such situations, the control components 145 may cause the audio earphone apparatus 100 to also transition into the power conserve mode (e.g., sleep mode or power off mode).

Adapting the audio earphone apparatus 100 to operate in accordance with one of a plurality of operating modes based on the relative distances between the first pod 125 and the second pod 130, and/or based on the effective length of the adjustable cable system 102, is further described with reference to FIG. 6. Each of the plurality of operating modes may correspond to at least one of a plurality of relative distances between the first pod 125 and the second pod 130, and/or to the effective length of the adjustable cable system 102. While FIG. 6 provide examples of three different relative distances between the first pod 125 and the second pod 130, and/or three different effective lengths of the adjustable cable system 102, it should be understood that the audio earphone apparatus 100 may be configured to have any number of relative distances and/or effective lengths corresponding to any number of operating modes.

Figure 6:
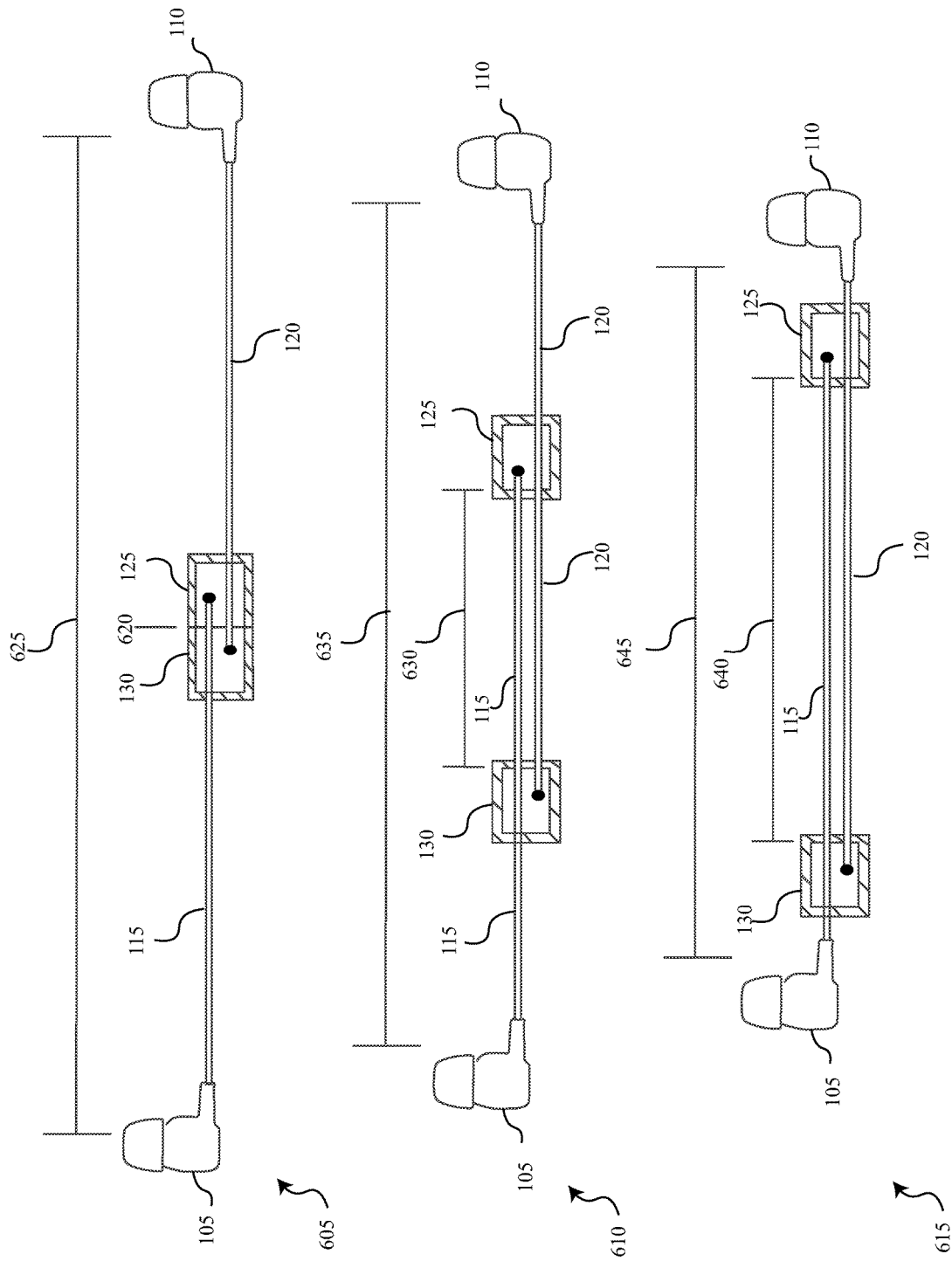
FIG. 6 is a set of front views of different extended length configurations of the adjustable cable system of the audio earphone apparatus, including cross-sectional views of the pods, where each configuration is associated with at least one of a plurality of operating modes, e.g., each configuration corresponds to one of a plurality of effective lengths of the adjustable cable system, and/or to different relative distances between the pods, in accordance with one implementation of the present disclosure.

For example referring to FIG. 6, in configuration 605, the audio earphone apparatus 100 may have a first effective length 625 of the adjustable cable system 102. The first relative distance between the first pod 125 and the second pod 130, and/or first effective length 625 of the adjustable cable system 102, may be associated with at least a first one of the plurality of operating modes of the audio earphone apparatus 100. In some examples, the plurality of operating modes of the audio earphone apparatus 100 may be associated with either the effective length (e.g., first effective length 625, second effective length 635, or third effective length 645) of the adjustable cable system 102, the relative distance (e.g., first relative distance 620, second relative distance 630, third relative distance 640) between the first pod 125 and the second pod 130, or combination of both. Thus, in some examples, the first effective length 625 and/or the first relative distance 620 may be associated with a first operating mode. In some examples, the association of the effective length and/or relative distance with different operating modes may be based on a range of lengths or distances, and not necessarily a specified length (e.g., first operating mode for first effective length range between 30-42 inches or 0-5 inches of relative distance range; second operating mode for second effective length range between 18-29 inches or 6-10 inches of relative distance range). Additionally, in some examples, the association of a respective operating mode may be associated with a combination of factors, such as the effective length and/or relative distance along with one or more other input signals, such as signals from the one or more sensors 155 and/or signals from other functional components (e.g., a host device, a charging component, a remote speaker) in communication with the audio earphone apparatus 100.

Thus, for example, first effective length 625 and/or first relative distance 620 may be a single length or distance value, respectively, or may be a range of length values or a range of distance values, respectively. In this case, where the first pod 125 and the second pod 130 are substantially touching or abutting one another (e.g., where the first relative distance 620 is minimized), the first effective length 625 defines a maximum effective length of the adjustable cable system 102.

In configuration 610, as the first pod 125 and the second pod 130 are pulled further apart relative to configuration 605 by the user, the relative distance between the first pod 125 and the second pod 130 may increase to a second relative distance 630. The second relative distance 630 between the first pod 125 and the second pod 130 may correspond to at least a second one of the plurality of operating modes of the audio earphone apparatus 100. Additionally, by increasing the relative distance (e.g., from first relative distance 620 to the second relative distance 630), the effective length of the adjustable cable system 102 may be reduced to a second effective length 635 (e.g., from first effective length 625 to the second effective length 635). The second effective length 635 and/or the second relative distance 630 may be a single length or distance value, respectively, or may be a range of length values or a range of distance values, respectively. In some examples, the second effective length 635 of the adjustable cable system 102 may be shorter than the first effective length of the cable system.

In configuration 615, the first pod 125 and the second pod 130 are further extended relative to configuration 610 to a third relative distance 640, which may transition the audio earphone apparatus 100 into at least a third operating mode. Additionally, by increasing the relative distance between the first pod 125 and the second pod 130, the effective length of the adjustable cable system 102 may be reduced further to a third effective length 645. The third effective length 645 and/or the third relative distance 640 may be a single length or distance value, respectively, or may be a range of length values or a range of distance values, respectively. In some examples, the third effective length 645 may be shorter than the second effective length 635, which as noted above, may be shorter than the first effective length 625 of the adjustable cable system 102. Further, in the case where the third relative distance 640 is maximized, e.g., by the first pod 125 and the second pod 130 reaching a position where they are fully separated while maintaining the first cable 115 and the second cable 120 in substantially parallel positions (which may be a position where the pod are touching the corresponding speaker units), the third effective length 645 corresponds to a minimum effective length of the adjustable cable system 102.

In some examples, the plurality of operating modes of the audio earphone apparatus 100 may also be associated with the sensor signal parameters. For example, when the one or more speaker units are detected as inserted in user's ear, a virtual assistant (e.g., Cortana) may be activated to listen to voice commands by the user. However, if both speaker units are detected to be removed from the user's ear, the audio earphone apparatus 100, including the virtual assistant may enter a standby mode to conserve power. Additionally or alternatively, the detection of change in state of the speaker unit (e.g., being inserted or removed from the user's ear) may trigger the audio earphone apparatus 100 to control one or more aspect of the media player (or host device). For example, when the user is using the headphones for a telephone call, removing one speaker unit may mute the audio of the telephone call, while removing both speaker units may trigger termination of the telephone call by the host device (e.g., when host device or media player are a mobile phone). Further examples of controlling aspects of the host device may include controlling one or more features of an application being executed on the host device. For example, if the user is using the host device or media player to track their workout or run, and one speaker unit is removed, the audio earphone apparatus 100 may trigger the host device to pause the application event (e.g., pause the tracking of the run/exercise), while removing both speaker units may end the tracking all together. Alternatively, when the speaker units are reinserted into user's ear, the audio earphone apparatus 100 may trigger the host device to resume the application event.

Referring below to Table 1, any of configurations 605, 610, and 615 (or any other possible configurations) of relative distance (D) or effective length (L), alone or in combination with other factors (e.g., signals from the one or more sensors 155) represented by sensor signals (S), may be detected by and cause the one or more control components 145 to operate the audio earphone apparatus 100 according to any one of a plurality of operating modes (M). In Table 1, the value of n may be any distance or length value or range of distance or length values, the value of m may be any integer corresponding to any number of sensors in communication with earphone apparatus 100, and the value of r may be any integer corresponding to any number of operating modes of earphone apparatus 100.

TABLE 1

Example Conditions Corresponding to Operating Modes

CONDITION(S)

| Rel. Distance (D) and/or Effective Length (L) | Sensor Signal (S) | Operating Mode(s) (M) |
|---|---|---|
| $D_1$ or $L_1$ | $S_1 \ldots S_m$ | $M_1 \ldots M_r$ |
| $D_n$ or $L_n$ | $S_1 \ldots S_m$ | $M_1 \ldots M_r$ |
| 0 or Max | | Audio Play |
| x or y | | Audio Pause |
| Max or Min | | Sleep/Charge |

TABLE 1-continued

Example Conditions Corresponding to Operating Modes

CONDITION(S)

| Rel. Distance (D) and/or Effective Length (L) | Sensor Signal (S) | Operating Mode(s) (M) |
|---|---|---|
| 0 or Max | Speaker Inserted | Audio Play |
| 0 or Max | Speaker Removed | Pause/Voice |
| 0 or Max | Speaker Removed + Charge Detected | Charging |
| | Single Speaker Inserted | Activate virtual assistant (e.g., Cortana) |
| | Both Speakers Removed | Sleep/Charge |
| | Single Speaker Removed | Mute Audio of a Telephone Call |
| | Both Speakers Removed | Terminate the Telephone Call |
| | Speaker Removed | Pause an Application Event |
| | Speaker Inserted | Resume the Application Event |

Figure 7:
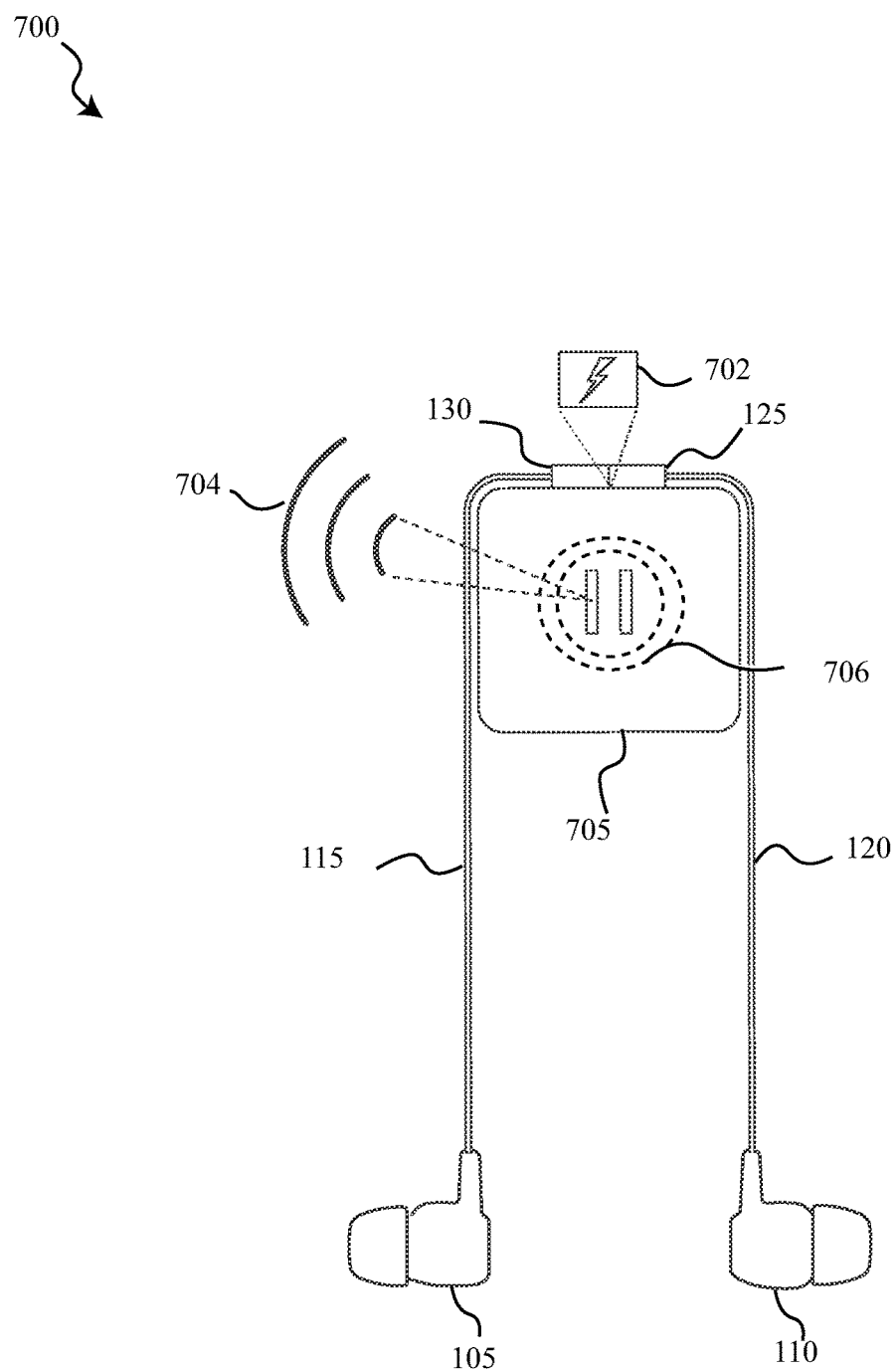
FIG. 7 is a front view of the example audio earphone apparatus of FIG. 1 connected to or in communication with an host device for charging the one or more batteries of the audio earphone and/or for outputting audio from built-in speakers of the host device, in accordance with one implementation of the present disclosure.

Referring to FIG. 7, in one example configuration 700, the audio earphone apparatus 100 may be connected with a host device 705 for performing one or more of the plurality of operating modes of the audio earphone apparatus 100. For example, the audio earphone apparatus 100 may be connected with a host device 705 for charging (as represented by icon 702) the one or more batteries (e.g., the first power source 135 and the second powers source 140) of the audio earphone apparatus 100, and/or for outputting audio (as represented by icon 704) from a built-in speaker(s) 706 of the host device 705. In some examples, for charging 702, the pod (e.g., the first batter pod 125 and the second pod 130) contacting the host device 705 may include inductive charging elements to allow for electrical current to be transferred from the host device 705 to the one or more pod via induction. For instance, the host device 705 may include an induction coil to create an alternating electromagnetic field from within a charging base. The inductive charging elements of the one or more pod of the audio earphone apparatus 100 may include a second induction coil that my receive power from the electromagnetic field and covert it back into electric current to the charge the batteries for the one or more pod.

In some implementations, the one or more control component 145 may detect a signal from a charging component of the audio earphone apparatus 100 that identifies the operation of the charging 702, and/or that identifies the contact between the audio earphone apparatus 100 to the host device 705. In response, the one or more control component 145 may automatically trigger transfer of audio output (e.g., a first audio output 103 and a second audio output 108) from the speaker units (e.g., first speaker unit 105 and second speaker unit 110) to the speaker unit(s) 706 associated with the host device 705. In some examples, the host device 705 and the audio earphone apparatus 100 may be paired for short range wireless communication (e.g., Bluetooth) via interaction of communication component 150 of the audio earphone apparatus 100 with a corresponding communication component on the host device 705. Thus, by way of placing the audio earphone apparatus 100 on the host device 705 or bringing the audio earphone apparatus 100 within a threshold proximity to the host device 705 (e.g., 10 feet), the audio earphone apparatus 100 may trigger the media player 175 associated with the audio earphone apparatus 100 to transmit audio signals to the host device 705. Thus, the portable media player 175 may transfer the audio signals to the host device 705 to output via speaker unit 706 without further involvement of the audio earphone apparatus 100. As such, in some examples, after initiating the transfer of the audio output, the audio earphone apparatus 100 may enter a power conserve mode (e.g., sleep mode or power off mode) to save battery power.

Figure 8:
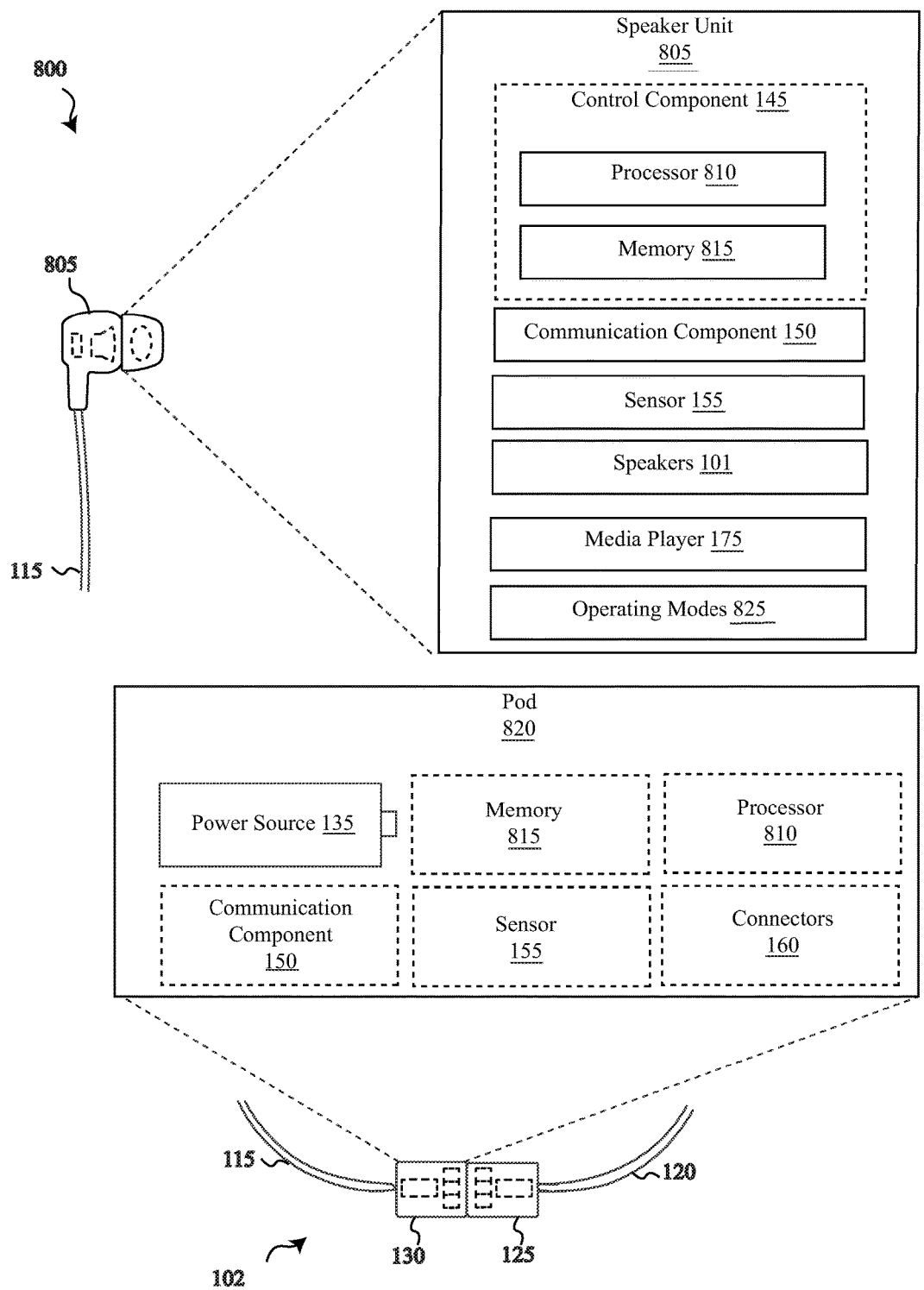
FIG. 8 is a schematic diagram illustrating an example of a hardware implementation of the example audio earphone apparatus of FIG. 1 in one implementation of the present disclosure.

FIG. 8 is a diagram 800 illustrating an example of a hardware implementation for an audio earphone apparatus 100 in accordance with various aspects of the present disclosure. As audio earphone apparatus 100 may include a speaker unit 805 (e.g., first speaker unit 105 or second speaker unit 110) for providing audio output from one or more built-in speakers 101. In some examples, the speaker unit 805 may include control component 145, such as a processor 810 and/or memory 815 that are configured to operate the audio earphone apparatus 100 according to one of the plurality of operating modes 825 defined above. For instance, the plurality of operating modes may be programmed into the processor 810, or stored in the memory 815 as computer-readable instructions that are executable by the processor 810. It should be appreciated that the control component 145, including the processor 810 and memory 815 are limited to be included within the headset 805. Instead, in some examples, the processor 810 and the memory 815 may be included in the one or more pods 820 (e.g., first pod 125 and/or the second pod 130). Memory 815 can include a type of memory usable by a peripheral device (e.g., audio earphones), such as random access memory (RAM), read only memory (ROM), tapes, magnetic discs, optical discs, volatile memory, non-volatile memory, and any combination thereof. Additionally, processor 810 and memory 815 may include and execute an operating system (not shown). Processor 810 can include a single or multiple set of processors or multi-core processors. Moreover, processor 810 can be implemented as an integrated processing system and/or a distributed processing system.

Each of the plurality of operating modes operated by the processor 810 may correspond to one of the relative distances between the first pod 125 and the second pod 130, and/or effective lengths of the adjustable cable system 102 (e.g., including first cable 115 and second cable 120). In some examples, the processor 810 may include instructions to determine whether the one of the plurality of relative distances between the first pod 125 and the second pod 130 is at least a first distance. In some examples, the processor 810 may switch the audio earphone apparatus to a power conserve mode when the one of the plurality of relative distances between the first pod 125 and the second pod 130 is less than the first distance. Accordingly, the processor 810 may transition to a first audio operating mode when the one of the plurality of relative distances between the first pod 125 and the second pod 130 is greater than the first distance.

In other examples, the processor 810 may determine whether the one of the plurality of relative distances between the first pod 125 and the second pod 130 satisfies at least a second distance. The processor 810 may maintain the audio earphone in the first audio operating mode when the one of the plurality of relative distances between the first pod 125 and the second pod 130 is greater than the first distance but less than the second distance, and transition the audio earphone to a second audio operating mode when the one of the plurality of relative distances between the first pod 125 and the second pod 130 exceeds the second distance.

In some implementations, the audio earphone apparatus 100 may also include a communication components 150 configured to enable communication exchanges between components of the audio earphone apparatus 100 and/or between the audio earphone apparatus 100 (and/or its components) and one or more external devices (e.g., a media player, a host device). The communication component 150 may be mounted within the speaker unit 805 and/or the pod 820 (e.g., first pod 125 or second pod 130). In an example, the communication components 150 may include one or more wireless communication interfaces (e.g., WiFi, Bluetooth, cellular) configured to allow communications or data to be exchanged between the audio earphone apparatus 100 and one or more other devices accessible via a respective wireless interface. For instance, the one or more communication components 150 may provide a Bluetooth interface to wirelessly link to the media player 175 so that music may be streamed to the speaker unit 805 (e.g., the first speaker unit 105 and/or the second speaker unit 110) of the audio earphone apparatus 100.

The communication component 150 may also be operable to receive inputs from a user of audio earphone apparatus 100. The communication component 150 may include one or more input devices for user interface, including but not limited to a microphone, a voice recognition component, a touch-sensitive display, a navigation key, a function key (e.g., volume control), or any other mechanism capable of receiving an input from a user, or any combination thereof. When the communication component 150 is configured within the pod 820, the communication component 150 may further include one or more output devices, including but not limited to a display, a haptic feedback mechanism, any other mechanism capable of presenting an output to a user, or any combination thereof. For example, a small display on the pods may illustrate the current music selection that is playing on the audio earphone.

Additionally or alternatively, the audio earphone apparatus 100 may include one or more sensors 155 for detecting a certain configuration of the audio earphone apparatus 100. For instance, the one or more sensors 155 may be configured to detect when the first speaker unit 805 is inserted or removed from the user's ear (or placed over the ear in instance of an over-the-ear headphones). In this example, the one or more sensors 155 may be pressure sensors or transducers that detect pressure change when the speaker unit 805 are inserted or removed from the user's ear. Alternatively, in this example, the one or more sensors 155 may be infrared sensors, proximity sensors, light sensors, touch sensor, or any other type of sensor that can detect when the speaker unit 805 are inserted (or near to) or removed from the user's ear. In this case, the one or more sensors 155 may be used to generate a signal that can be an input to the one or more control components 145 to cause triggering of respective ones of the plurality of operating modes of the audio earphone apparatus 100.

Alternatively, the one or more sensors 155 may be configured to detect the effective length of the adjustable cable system, or a relative distance along the adjustable cable system between the first pod 125 and the second pod 130. In this example, for instance, the one or more sensors 155 may include a proximity sensor (e.g., to detect the proximity of the first pod 125 relative to the second pod 130), such as an inductance sensor, infrared sensor, or light sensor. In this case, the one or more sensors 155 may be used to generate a signal that can be an input to the one or more control components 145 to cause triggering of respective ones of the plurality of operating modes of the audio earphone apparatus 100. It should be appreciated by those of ordinary skill that the sensors can be included in either the speaker unit 805, the one or more pods 820, other parts (e.g., extensions attached to the electrical wire) of the audio earphone apparatus 100, combination of each.

According to the present disclosure, the audio earphone apparatus 100 may also include an adjustable cable system 102 that allows the user to adjust the effective length of the audio earphones 100. The adjustable cable system 102 includes a combination of first cable 115 fixedly connected to a first pod 125 and second cable 120 fixedly connected to a second pod 130. The first pod 125 is movably connected to the second cable 120 and the second pod 130 is movably connected to the first cable 115. Further, the first cable 115 and the first pod 125, and the second cable 120 and the second pod 130, can be moved relative to one another to change an effective length of the adjustable cable system 102. In diagram 800, one pod 820 (e.g., first pod 125 or the second pod 130) illustrates the hardware subcomponents included within the cavity of the pod 820. In some examples, the pod 820 may include at least one power source 135 (e.g., battery) to provide power to operate the electrical components of the audio earphones 100 (e.g., control component 145, communication component 150, one or more sensors 155, and speakers 155).

Figure 9:
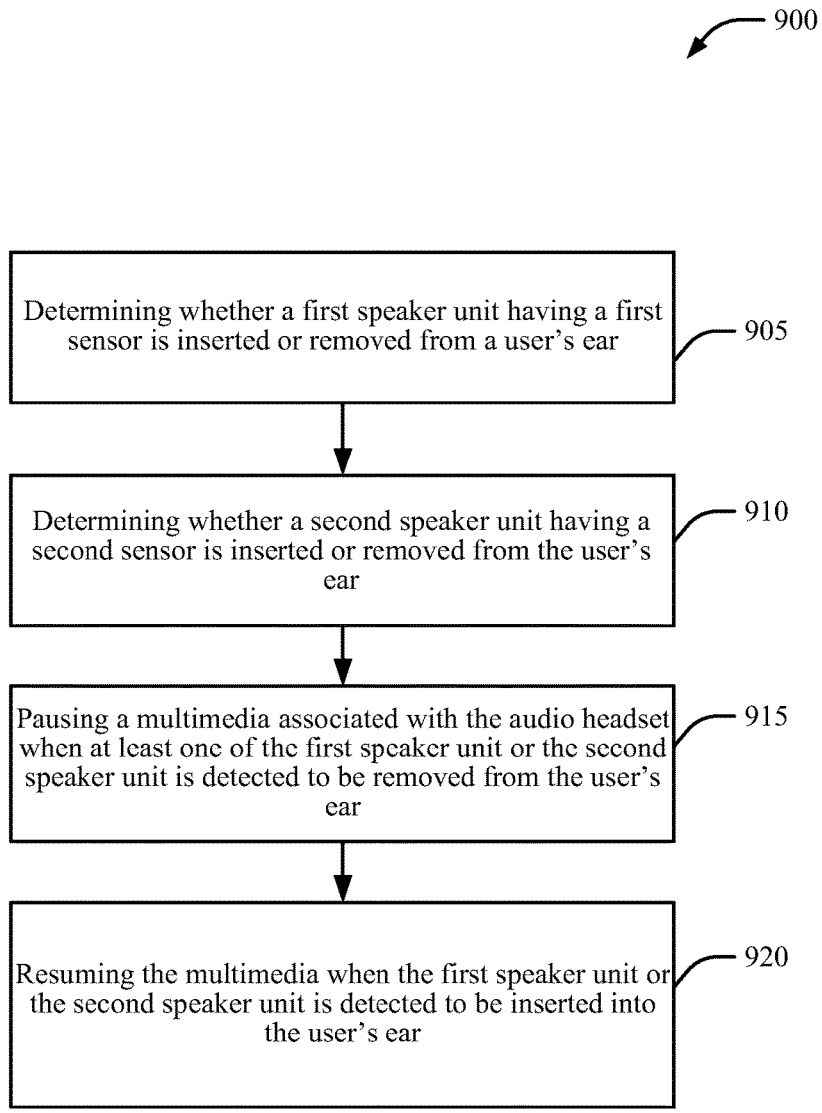
FIG. 9 is a flowchart of an example method of operation of the example audio earphone apparatus of FIG. 1, in accordance with one implementation of the present disclosure.

Referring to FIG. 9, one example of a method 900, which may be implemented by the audio earphone apparatus 100, includes one or more actions in accordance with various aspects of the present disclosure.

At block 905, the method may include determining whether a first speaker unit having a first sensor is inserted or removed from a user's ear. In some examples, the first sensor may detect the pressure change when the first speaker unit is inserted or removed from the user's ear. In some examples, aspects of block 905 may be performed by the one or more sensors 155 described with reference to FIGS. 1 and 8. In some aspects, the one or more sensors 155 may be either part of the speaker units and/or the one or more pods.

At block 910, the method may include determining whether a second speaker unit having a second sensor is inserted or removed from the user's ear. Similar to the first sensor, the second sensor may detect the pressure change when the first speaker unit is inserted or removed from the user's ear. In some examples, aspects of block 910 may also be performed by the one or more sensors 155 described with reference to FIGS. 1 and 8.

At block 915, the method may include pausing a multimedia associated with the audio earphone when at least one of a first speaker unit or the second speaker unit is detected to be removed from the user's ear. In some examples, aspects of block 915 may be performed by the processor 810 executing one of the plurality of operating modes described with reference to FIGS. 1-8. The processor 810, in some aspects, may utilize the communications component 150 to transmit instructions to the media player associated with the audio earphone to pause the multimedia when the one or more sensors 155 detects that one or both of the first speaker units or the second speaker units have been removed from the user's ear.

At block 920, the method may include resuming the multimedia when the first speaker unit or the second speaker unit is detected to be inserted into the user's ear. In some examples, aspects of block 920 may also be performed by the processor 810 described with reference to FIG. 8. The processor, in some aspects, may utilize the communications component 150 to transmit instructions to the media player associated with the audio earphone to resume the multimedia when the one or more sensors 155 detect that one or both of the first speaker units or the second speaker units have been inserted into the user's ear.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, or modules and/or may not include all of the devices, components, modules discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. An audio earphone apparatus, comprising:
    a first speaker unit for providing a first audio output;
    a second speaker unit for providing a second audio output;
    an adjustable cable system connected to the first speaker unit and the second speaker unit;
    at least a first pod and a second pod, wherein the first pod and the second pod are separately connected to different parts of the adjustable cable system such that relative movement between the first pod and the second pod adjusts an effective length of the adjustable cable system;
    at least one power source mounted within at least one of the first pod or the second pod; and
    a processor in communication with a memory having instructions that define a plurality of operating modes for operating the audio earphone apparatus, wherein each of the plurality of operating modes corresponds to at least one of a plurality of relative distances between the first pod and the second pod.

2. The audio earphone apparatus of claim 1, wherein the adjustable cable system connected to the first speaker unit and the second speaker unit includes:
    a first cable having respective fixed connections with the first speaker unit and the first pod and having a first movable connection with the second pod; and
    a second cable having respective fixed connections with the second speaker unit and the second pod and having a second movable connection with the first pod.

3. The audio earphone apparatus of claim 1, wherein the first pod and the second pod each have a relative position that corresponds to a reduced effective length of the cable system.

4. The audio earphone apparatus of claim 2, wherein the effective length of the adjustable cable system comprises a distance between the first speaker unit and the second speaker unit.

5. The audio earphone apparatus of claim 1, wherein the first speaker unit includes a first sensor and the second speaker unit includes a second sensor, the first sensor and the second sensor configured to determine whether the first speaker unit and the second speaker unit are inserted or removed from a user's ear.

6. The audio earphone apparatus of claim 5, wherein the processor operates the audio earphone apparatus in one of the plurality of operating modes based on signals from at least one of the first sensor or the second sensor, wherein the plurality of operating modes includes pausing multimedia associated with the audio earphone apparatus and resuming the multimedia.

7. The audio earphone apparatus of claim 1, wherein the processor operates the audio earphones apparatus in a first operating mode of the plurality of operating modes based on determination that the audio earphone apparatus is within a predetermined range of a host device, wherein the first operating mode includes transferring the audio output from the audio earphone apparatus to the host device and transitioning the audio earphone apparatus into power conserve mode.

8. The audio earphone apparatus of claim 7, wherein at least the first pod having the first power source and the second pod having the second power source are charged by the host device while the audio earphone apparatus is in the power conserve mode.

9. The audio earphone apparatus of claim 1, wherein the instructions that define the plurality of operating modes for operating the audio earphone apparatus, further include instructions for:
  determining whether the one of the plurality of relative distances between the first pod and the second pod is at least a first distance;
  switching the audio earphone apparatus to a power conserve mode when the one of the plurality of relative distances between the first pod and the second pod is less than the first distance; and
  transitioning to a first audio operating mode when the one of the plurality of relative distances between the first pod and the second pod is greater than the first distance.

10. The audio earphone apparatus of claim 9, further comprising:
  determining whether the one of the plurality of relative distances between the first pod and the second pod satisfies at least a second distance;
  maintaining the first audio operating mode when the one of the plurality of relative distances between the first pod and the second pod is greater than the first distance but less than the second distance; and
  transitioning to a second audio operating mode when the one of the plurality of relative distances between the first pod and the second pod exceeds the second distance.

11. The audio earphone apparatus of claim 1, wherein the first audio operating mode is audio player mode and the second audio operating mode is voice communication mode.

* * * * *